Nov. 18, 1930.  J. L. THEOBALD  1,782,127
TESTING DEVICE
Original Filed Oct. 27, 1926
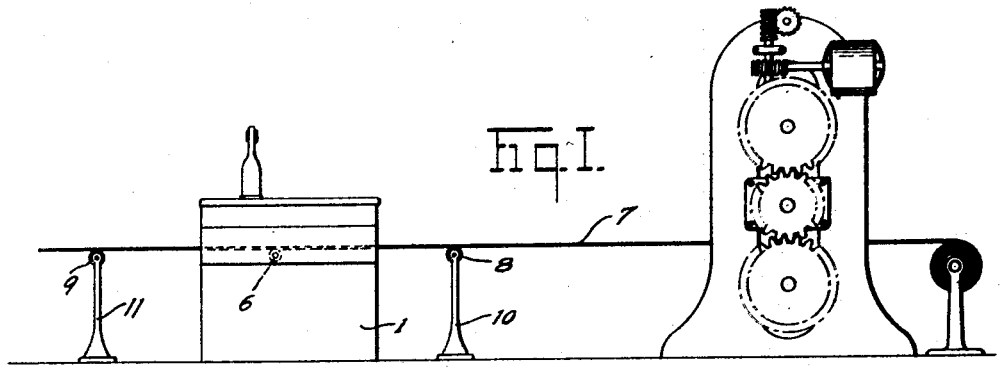
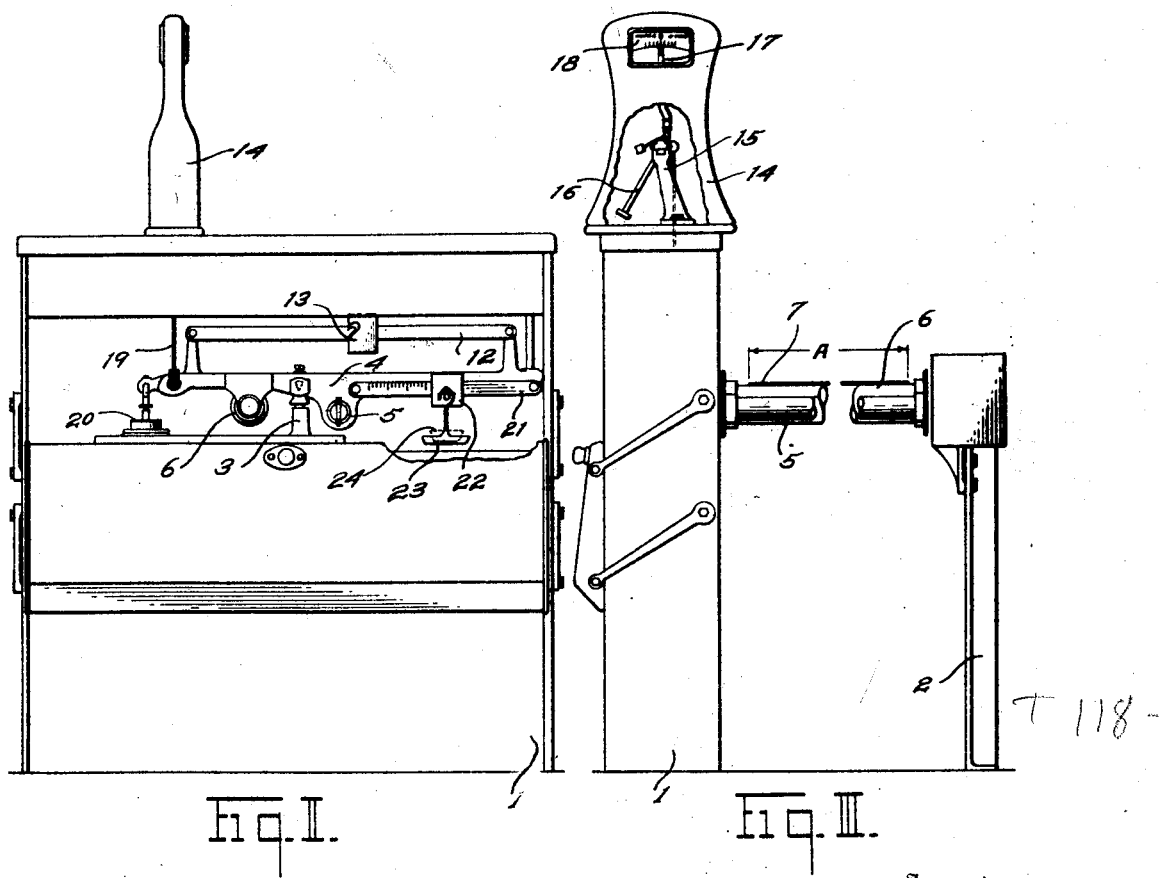
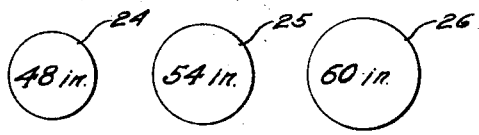
Inventor
John L. Theobald
By Geo. W. Marshall,
Attorney Patented Nov. 18, 1930

1,782,127

UNITED STATES PATENT OFFICE

JOHN L. THEOBALD, OF DAYTON, OHIO, ASSIGNOR TO TOLEDO SCALE COMPANY, OF TOLEDO, OHIO, A CORPORATION OF NEW JERSEY

TESTING DEVICE

Application filed October 27, 1926, Serial No. 144,436. Renewed April 25, 1930.

This invention relates to testing devices, and more particularly to devices for testing the weight per unit of length of pliable material in strip form.

The principal object of the invention is to provide means for quickly and accurately adjusting the machine for testing material of a given width.

In many mills sheet material is produced in several widths and it is necessary to set a testing device such as a continuous weighing scale each time the width of the material is changed. Such re-setting has heretofore required work of a skilled operator. It is an object of my invention to provide means whereby the scale may be set for different widths by unskilled persons.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view showing a continuous weighing scale of the form to which I have applied my invention, in use in conjunction with a calendering machine;

Figure II is an enlarged elevational view showing the cabinet and one of the levers of the testing device, with my invention incorporated therein, part of the cabinet being broken away;

Figure III is a side elevational view showing the cabinet with a part of the surmounting housing broken away to display an automatic load-counterbalancing device and a strip supporting roller with a part broken out to save space;

Figure IV is a top plan view of some unit weights forming a part of the mechanism of my invention.

I have shown the invention as used in conjunction with a calendering machine for coating fabrics, but it is understood that it may be utilized in the testing of woven fabrics or other sheet materials and wherever else it may be applicable.

The mechanism of my device is supported by a cabinet 1 and a standard 2. Within the cabinet 1 is a fulcrum stand 3 upon which is pivoted a lever 4. A short lever (not shown) is pivoted on the standard 2 and rigidly connected to the lever 4 by means of a pipe 5. Supported by the levers and extending parallel to the pipe 5 is a roller 6 mounted on frictionless bearings and adapted to support a strip 7 of material to be tested. The strip 7 is also supported by rollers 8 and 9 on standards 10 and 11 so that half of the weight of the fabric between the rollers 8 and 9 is carried by the roller 6. The weight of the roller 6 and other parts of the mechanism on one side of the fulcrum pivot is counterbalanced in part by the weight of the parts on the other side of the fulcrum pivot, a beam 12 with a sliding poise 13 being provided to enable the parts to be brought to counterbalance.

Surmounting the cabinet 1 is a housing 14 within which is mounted a stand 15 upon which is pivoted a load-counterbalancing pendulum 16 integral with which is an indicating hand 17 arranged to co-operate with a predetermined weight chart 18. The pendulum is connected by means of a rod 19 to the lever 4 so that when the condition of balance is such that the pendulum may swing downwardly and lift the end of the lever to which it is attached the indicator hand swings to the "under" side of the predetermined weight mark, and when the condition of balance is such that the end of the lever to which the pendulum is connected swings downwardly and elevates the pendulum the indicator hand swings to the "over" side of the predetermined weight mark. A dash pot 20 is connected to the lever 4 to damp the vibration of the mechanism.

To counterbalance the weight of the commodity supported by the roller 6 the lever 4 is equipped with a suitably graduated beam 21 upon which is slidably mounted a poise 22, and pivotally suspended from the poise 22 is a unit weight pan 23 adapted to carry a unit weight 24. With the scale is provided a series of unit weights such as are shown at 24, 25 and 26 in Figure IV, one unit weight for each width of material to be tested. The parts are so proportioned and arranged that with the poise 22 carrying the unit weight 24 set in position to test a given material of 48 ins. in width the device may be adjusted to test similar material 54 ins. in width by merely replacing the unit weight 24 with the unit weight 25. If the poise 22 carrying the unit weight 24 were set in position to test a lighter material of 48 ins. in width the device can be instantly readjusted for 54 in. material of the same light weight by replacing the unit weight 24 with the unit weight 25. Each unit weight is marked, as shown in Figure IV, to correspond with the width of material for which it is intended to be used.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, means adapted to support a movable strip of material, means whereby such support is continuously subjected to a definite length of such material; means for coating said moving strip of material, and counterbalancing means for such material including a series of selectively replaceable unit weights corresponding to the width of the material to be tested.

2. In a device of the class described, in combination, means for supporting a moving strip of material to be tested, means whereby such support is subjected to the weight of a definite length of such material; counterbalancing means for such material including a beam, a slide on said beam adapted to be positioned according to the weight per unit of area of such material, means on said slide for carrying a unit weight, and a series of unit weights to be selectively carried by said means, said unit weight corresponding to the width of the material to be tested.

3. In a device of the class described, in combination, a support for a moving strip of material to be tested, means whereby such support is subjected to the weight of a definite length of such material, a series of unit weights corresponding to various widths of material, and means for supporting said unit weights in counterbalancing position corresponding to various weights of material.

4. In a device of the class described, in combination, a lever, a roller supported by said lever and adapted to support a moving strip of material to be tested, means whereby said roller is subjected to the weight of a definite length of such material, a beam carried by said lever, a slide on said beam adapted to be set in positions corresponding to various weights of material, means on said slide for carrying unit weights, and a series of unit weights adapted to be selectively placed on said carrying means, said unit weights corresponding respectively to various widths of material to be tested.

5. In a device of the class described, in combination, a lever, a roller supported by said lever and adapted to support a moving strip of material to be tested, means whereby said roller is subjected to the weight of a definite length of such material, a beam carried by said lever, a slide on said beam adapted to be set in positions corresponding to various weights of material, means on said slide for carrying unit weights, a series of unit weights adapted to be selectively placed on said carrying means, said unit weights corresponding respectively to various widths of material to be tested, and automatic load-counterbalancing and indicating means connected to said lever.

JOHN L. THEOBALD.